United States Patent [19]

Reber

[11] Patent Number: 5,564,863
[45] Date of Patent: Oct. 15, 1996

[54] METHOD AND APPARATUS FOR POINT-REPAIR OF SEWER AND OTHER UTILITY LINES

[75] Inventor: Cleve C. Reber, Pasadena, Tex.

[73] Assignee: TTI Trenchless Technologies, Inc., Conroe, Tex.

[21] Appl. No.: 402,866

[22] Filed: Mar. 13, 1995

[51] Int. Cl.$^6$ ..................................... F16L 55/18
[52] U.S. Cl. ............................... 405/154; 138/98
[58] Field of Search ..................... 405/154, 156; 138/97, 98

[56] References Cited

U.S. PATENT DOCUMENTS

| | | | |
|---|---|---|---|
| 4,170,248 | 10/1979 | Bennett et al. | 138/97 |
| 4,728,223 | 3/1988 | Rice | 405/156 X |
| 5,364,207 | 11/1994 | Reber et al. | 405/303 |

FOREIGN PATENT DOCUMENTS

| | | | |
|---|---|---|---|
| 1-193489 | 8/1989 | Japan | 405/154 |
| 4-83987 | 3/1992 | Japan | 405/154 |

Primary Examiner—David J. Bagnell
Attorney, Agent, or Firm—Mary J. Gaskin

[57] ABSTRACT

The present invention is directed to a method and apparatus for making point-repairs in sewer and other utility lines. The method involves positioning a section of polyolefin, preferably polyethylene, pipe by drawing or pulling it into and through the undamaged portion of the damaged sewer line requiring repair and fixing or securing from the surface the section of polyolefin pipe into place. The present invention is also directed to point-repair collapsible heads and a point-repair insertion tool for assisting in the positioning of the section of polyolefin pipe into the damaged sewer line requiring repair by pulling the point-repair insertion tool which includes the section through the line to the place where repair is required and collapsing the heads and removing them by cable from the section and the damaged sewer line.

14 Claims, 4 Drawing Sheets

1

METHOD AND APPARATUS FOR POINT-REPAIR OF SEWER AND OTHER UTILITY LINES

FIELD OF THE INVENTION

The present invention is directed to making point-repairs in sewer and other utility lines. More specifically, the present invention is directed to a method of making a point-repair of a damaged or broken sewer pipe and apparatus for assisting in the repair including a pair of collapsible heads. The method involves positioning a section of polyolefin, preferably polyethylene, pipe into the damaged or broken sewer line requiring repair and fixing or securing the polyolefin section of polyolefin from the surface within the damaged sewer pipe. The present invention also includes a point-repair insertion tool to assist in the positioning of the section of polyolefin pipe into the damaged sewer line requiring repair.

BACKGROUND OF THE INVENTION

The repair of a damaged or broken sewer pipe may require its complete replacement. A complete replacement may be to dig out the old line and replace the entire distance between man holes, a distance of up to about 400 feet or the replacement of the section of the line where the problem occurs, a section of four feet or more, referred to herein as a point-repair. Currently a point-repair requires a back hoe to dig a pit to obtain access to the broken section, remove the section and permit a person to get into the pit to connect a new section, usually a section of polyvinylchloride (PVC) pipe, to the old line. A person must be in the pit since the present connections, such as a Femco connector or adapter, are placed on the ends of the old pipe and the new section and are clamped. These clamps are similar to the clamps used on car hoses. The clamps surround the ends of the pipes and are tighten by a screw driver. Since a connector must be placed on each end of the new section, the pit must be large enough to allow a person to make the connection at both ends of the new section. A point-repair may be the required because an old pipe has a collapsed upper wall, the joints of the old pipe separate causing a break in the line, or a service connection or a tree root causes an intrusion into the old line. Whatever the reason, the present methods of point-repair require that large pits be made to connect a new section of pipe and the sewer lines often are in the back yards of homes or in streets or parking lots of businesses.

The method and apparatus of the present invention overcome the disadvantages of the methods now used for making point-repairs.

SUMMARY OF THE INVENTION

The present invention is directed to a method and apparatus for making point-repairs in sewer and other utility lines. The method involves positioning a section of polyolefin, preferably polyethylene, pipe by drawing or pulling it into and through the undamaged portion of the damaged sewer line requiring repair and fixing or securing from the surface the section of polyolefin pipe into place. The present invention is also directed to point-repair collapsible heads and a point-repair insertion tool for assisting in the positioning of the section of polyolefin pipe into the damaged sewer line requiring repair by pulling the point-repair insertion tool which includes the section through the line to the place where repair is required and collapsing the heads and removing them by cable from the section and the damaged sewer line.

DESCRIPTION OF THE PREFERRED EMBODIMENTS

The present invention is directed to the point-repair of a damaged utility line. The invention will be illustrated by the repair of a damaged sewer line providing a preferred embodiment; however, the invention is not limited to a sewer line. Sewer lines which require repair and are now in place have been constructed using joints or sections of concrete or tile pipe, although certain plastic truss pipe such as polybutylene has also been used. These sewer lines extend between manholes which are usually about 400 feet apart. A "damaged" pipe is not limited to a meaning of broken, split, cracked or fractured but to any pipe not which has a problem or is not in optimum working condition. The nature of the damaged sewer pipe is that the problem is at a "point", meaning within a one foot to 40 foot length, as contrasted to a problem where the entire pipe between manholes requires repair. The cause of the "damaged" pipe and the "point" of the problem is easily determined by running a television camera into the damaged sewer line. During this operation, high pressure water is used to clean the line and open the line for the point-repair of the present invention. This operation also locates the point where the repair operation should be made.

The TV operation will provide the distances from a manhole to the problem area in the damaged sewer pipe. The problem area may be readily apparent from the surface.

Figure 1:
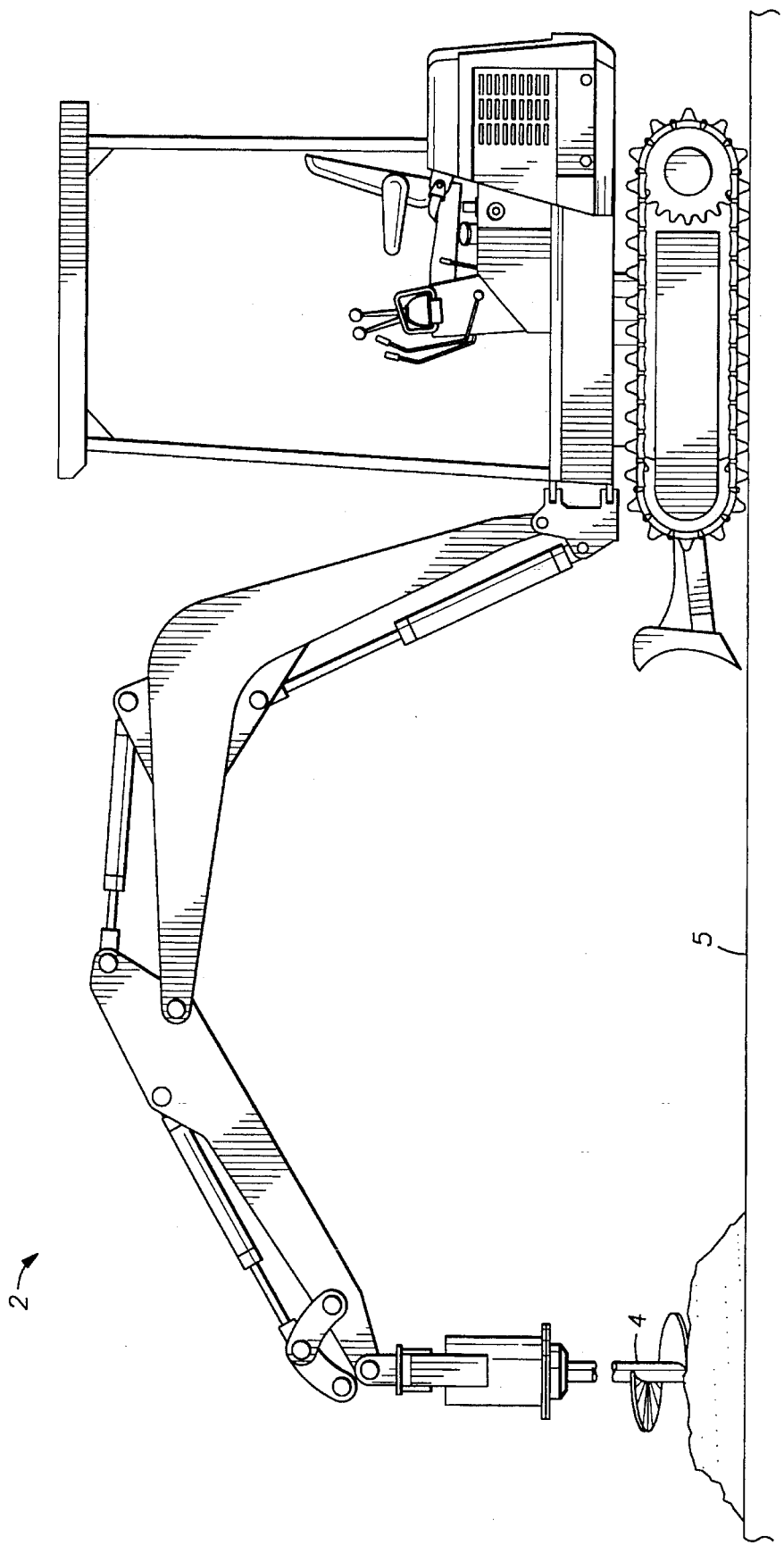
FIG. 1 illustrates an back hoe or excavator with an auger attached to drill to the damaged or broken sewer pipe.
Figure 2:
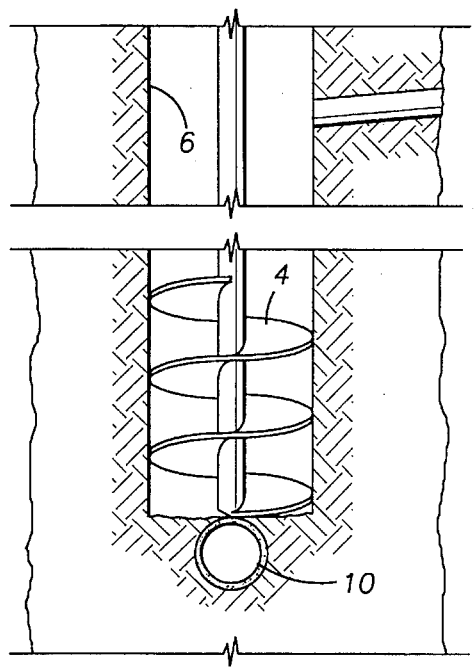
FIG. 2 illustrates the auger forming an opening in the top surface of the sewer pipe.

According to the method of the present invention, at least one Opening is made to the damaged pipe. Referring now to FIG. 1, the preferred way to make the opening is to locate a backhoe 2 over the point of the damaged sewer line and drill an opening to the damaged line by using an auger 4 powered by the backhoe 2. It is possible to employ the backhoe 2 with a bucket to dig down to the damaged sewer pipe. Since the sewer line runs at depths of 5 feet (5') to 15 feet (15') below the Surface 5, it is usually desired to remove as little dirt as possible. This step of making an opening is in contrast to the amount of dirt required to be removed to place a person in a pit to make a repair as is used in the old methods of point-repair. A preferred auger 4 will make a 24 inch (24") opening 6 as it drills down to the damaged sewer line 10, illustrated in FIG. 2. It is understood that the opening can be made without the use of backhoe or that something other than an auger can make the opening.

The auger 4 is removed and the top of damaged sewer pipe 10 is opened if not already open. The opening 6 provides a clear sight into the inside of the damaged sewer pipe 10 at the point where the repair will be made.

Figure 3:
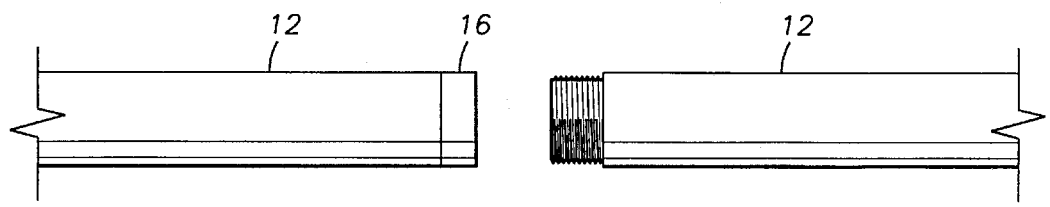
FIG. 3 illustrates sections of polyethylene pipe which has been threaded for easily coupling and assembly in a manhole.
Figure 4:
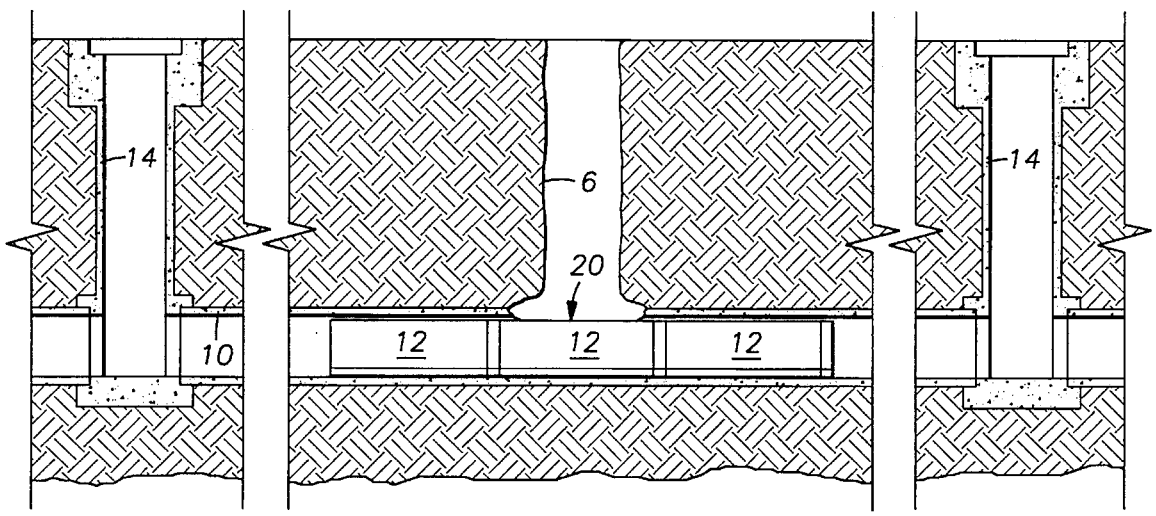
FIG. 4 illustrates a sewer line extending between two manholes with a section of sewer pipe, a section of threaded polyethylene pipe within the section of sewer pipe extending beyond the damaged or broken section and an opening extending from the surface to the section of sewer pipe.

Referring now to FIG. 3 and FIG. 4, in the preferred embodiment of the present invention, threaded joints 12 of polyethylene pipe are used to make a section of pipe having a length greater than the damaged section of sewer pipe 10. The joints 12 are less than 48" long since a typical man hole 14 has a 48" diameter. The joints 12 have an outer diameter which is less than the inner diameter of the damaged sewer pipe 10 being repaired. The joints 12 are threaded together in the man hole by inserting one joint 12 into the damaged sewer pipe 10 and threading another joint 12 to the joint 12 in the pipe 10. This continues until the joints 12 make up a section of polyethylene pipe which is greater in length than the damaged section of the sewer pipe 10 to be repaired. Alternatively, short sections of pipe may be fused to the repair section of polyethylene pipe. The preferred pipe is high density polyethylene pipe made by such manufacturers as Phillips Chemical; however, other polyolefin pipe such as polypropylene or copolymers of ethylene and other materials may be used. Preferably, the end 16 of each joint 12 is painted with a spray paint, preferably white or yellow. The threaded joints 12 make up a section 20 of polyethylene pipe which is positioned under the opening 6. As the section 20 passes within pipe 10 under the opening 6 the painted ends 16 can be seen and the center joint, for example, can be positioned under the opening 6. Alternatively, the section 20 of pipe can be marked so that the mark is positioned under the opening 6.

Figure 5:
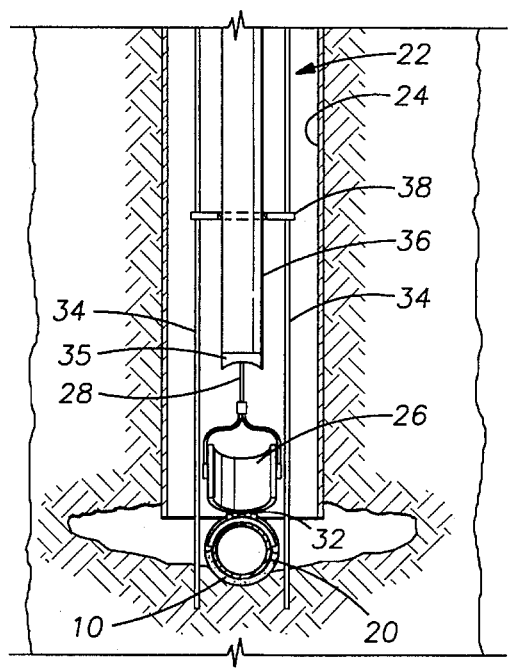
FIG. 5 illustrates a down-hole fusing machine fusing a t-section of polyethylene pipe to the section of polyethylene pipe pulled into the damaged section of sewer pipe which is the preferred embodiment for securing the section.

The section 20 once located under the opening 6 is secured within the damaged sewer line 10. A preferred manner of securing the section 20 in place is to fuse a t-section of polyolefin to the polyolefin section 20. A down hole fusing machine 22 is placed in the opening 6 and seats on the section of threaded polyethylene pipe 20 to make such a fuse. The fusing machine is described in detail in U.S. Pat. No. 5,364,207 and U.S. patent application Ser. No. 08/339, 335, both of which are incorporated herein by reference. In summary, referring to FIG. 5 a casing 24 is placed in opening 6. The fussing machine or apparatus 22 includes a heating element 26 which may be lowered so as to sit on the top surface of a section of polyethylene pipe 20. The heating element 26 is mechanically movable from the upright position shown in FIG. 5 to a position on the surface of the polyethylene pipe 20 by a handle 28, operated from the surface. The heating element 26 operates on a saddle 30 which sits on the polyethylene pipe 20 which includes a hinge 32. The fusing machine or apparatus 22 also includes a supporting structure 34 which carries a t-section made of polyethylene pipe 36. The t-section of polyethylene pipe 36 has an end 35 having the same radius as the outer radius of the polyethylene pipe 20 and is fused to the surface of the section of polyethylene pipe 20, as described in detail hereinafter. The t-Section 36 is supported and aligned over the polyethylene pipe 20 by sleeves and/or clamps 38 which are connected to and slidable on the supporting structure 34 lowered into the opening 6. The supporting structure 34 may be rods on which the sleeves and/or clamps 38 are attached to align the t-section 36 on the polyethylene pipe 20 and lower and raise the t-section 36. In summary, the heating plate 26 is lowered onto the upper surface of polyethylene pipe 20 and the t-section 36 lowered onto the top of heating plate 26. Electricity is turned on to the heating elements in heating plate 26 and both the top and bottom surfaces of the plate are heated to temperatures of over 400° F. (about 450° to 550° F.) and thus the upper surface of polyethylene pipe 20 and the end 35 of the polyethylene t-section 36 are heated. After about five minutes with heat and pressure being applied, the melt temperature of the polyolefin is reached and the t-section 36 is raised. The heating plate 26 is quickly raised from the upper surface of the section 20 and out of the way so that the t-section can be lowered onto the upper surface of pipe 20 under pressure to fuse the t-section 36 to the pipe 20. The length of t-section 36 extends sufficiently up into the opening 6 to secure the section 20 to which the t-section is fused in the damaged pipe 10. An alternative to fusing a t-section is to introduce a grouting material such as cement on top of the section 20 to hold the section 20 in the damaged pipe 10. If a grouting material is used more than one opening 6 may be used. Also after the section of polyethylene 20 and the t-section 36 have cooled and the fusing apparatus 22 has been removed from the opening 6, including the casing 24, a grouting material may be placed around the t-section 36 to more firmly secure the section 20 in the damaged pipe 10. Suitable grouting material may include cement or plastic cements which include epoxies or other thermosetting resins.

After securing the section 20 in the damaged pipe 10, the opening 6 is then filled. In the prefered method, the t-section 36 maintains the threaded sections of polyethylene pipe 20 in place and the sewer line is back in operation and working order.

The present invention also is directed to a point-repair insertion tool which assists in positioning the polyolefin section 20 in place under the opening 6. The point-repair insertion tool has two collapsible insertion heads, one preferred embodiment of the nose head is shown in FIG. 6 and the preferred embodiment of the base head is shown in FIG. 7

Figure 6:
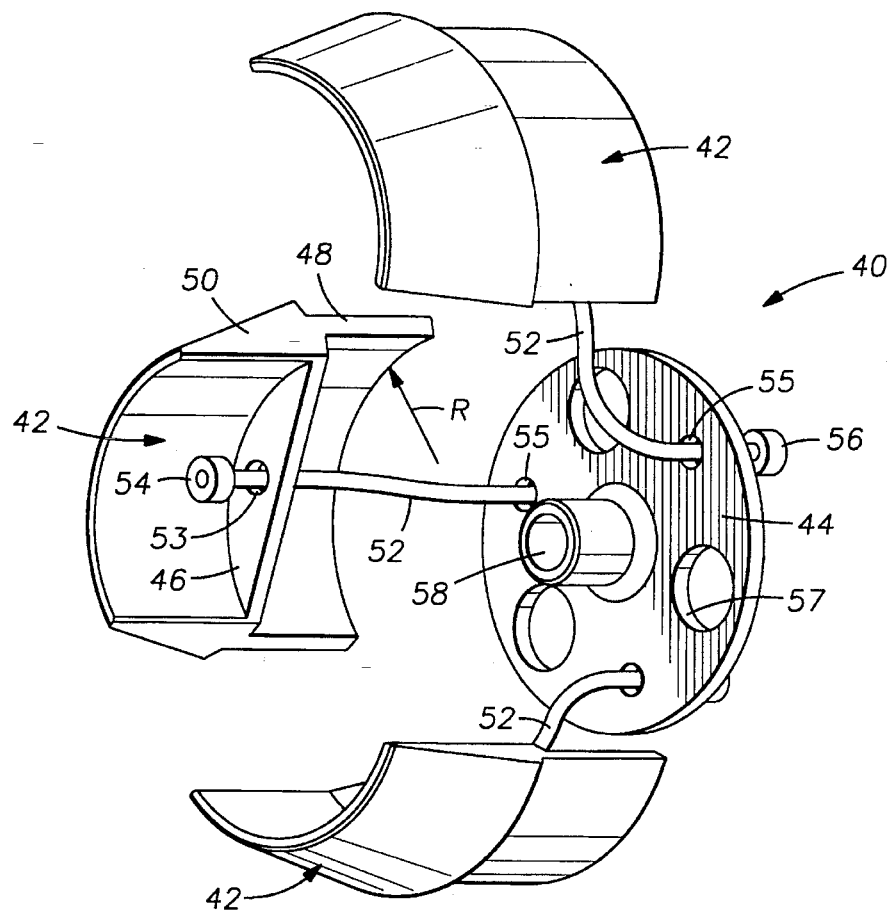
FIG. 6 and FIG. 7 illustrate the preferred embodiment of nose and base point-repair collapsible heads for pulling the threaded sections of polyethylene pipe into the broken section of sewer pipe.

The collapsible head 40 as illustrated in FIG. 6 is designed for the nose end of the insertion tool or stated in other words is the head which is placed into the front end of the first joint 12 placed into the damaged sewer pipe 10 at one man hole 14 and will be pulled through the damaged sewer pipe 10. Collapsible head 40 has at least two, preferably three, hollow cylindrical sections 42. Each section 42 has a inner radius R which is the same as the radius of plate 44. Also each section 42 has a radially extending support member 46. When the three sections 42 are placed with the radially extending supporting member 46 in contact with the plate 44, there are gaps between sections of at least 5°, preferably 10° to 30°. Thus, the cumulative circumference of all three sections is less than 345°, preferably between 330° and 270°. The outside surface 48 of each section 42 has a diameter which is essentially that of the inside diameter of the polyethylene joints 12. The sections 42 are placed around the plate 44 and inserted into the first joint 12. Additional joints 12 are threaded to the first joint 12 until the section 20 is the desired length (only one joint 12 being shown in the drawings). Each sections 42 of the collapsible head 40 has a conical section 50. This tapered portion of the head 40 assists in positioning the section 20 when the sewer pipe 10 is out of round or has collapsed and requires a smaller portion to pull the section 20 into place. Each section 42 has a flexible cable 52 placed through a hole 53 in the extending support member 46 with a head 54 larger than the hole 53 securely fixed to the cable 52. The other end of the cable passes through an opening 55 in plate 44 with a head 56 larger than the hole 55 securely fixed to the cable 52. As will be explained later in more detail, the cables 52 loosely connect the sections 42 to the plate 44 so that when the head 40 is removed the plate 44 and sections 42 will all be pulled out of the section 20. The plate 44 has openings 57 and a central opening 58 for a cable, as will be explained later in more derail.

Figure 7:
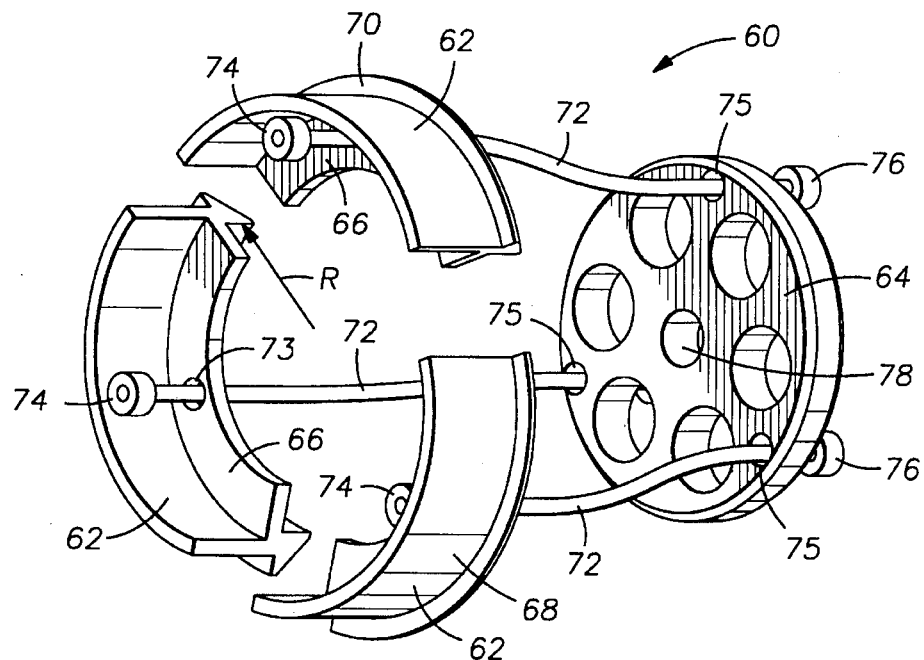

The collapsible head 60 as illustrated in FIG. 7 is designed for the base end of the insertion tool or stated in other words is the head which is placed into the back end of the last joint 12 placed into the damaged sewer pipe 10 at the man hole 14. Collapsible head 60 has at least two, preferably three, hollow cylindrical sections 62. Each section 62 has a inner radius R2 which is the same as the radius of plate 64. Also each section 62 has a radially extending support member 66. When the three sections 62 are placed with the radially extending supporting member 66 in contact with the plate 64, there are gaps between sections of at least 5°, preferably 10° to 30°. Thus, the cumulative circumference of all three sections is less than 345°, preferably between 330° and 270°. The outside surface 68 of each section 62 has a diameter which is essentially that of the inside diameter of the polyethylene joints 12. The sections 62 are placed around the plate 64 and inserted into the last joint 12. Each sections 62 of the collapsible head 40 has a base lip 70. This lip 70 of the head 60 assists in positioning the section 20 as section 20 is pulled into place. Each section 62 has a flexible cable 72 placed through a hole 73 in the extending support member 66 with a head 74 larger than the hole 73 securely fixed to the cable 72. The other end of the cable passes through an opening 75 in plate 64 with a head 76 larger than the hole 75 securely fixed to the cable 72. As will be explained later in more detail, the cables 72 loosely connect the sections 62 to the plate 64 so that when the head 60 is removed the plate 64 and sections 62 will all be pulled out of the section 20. The plate 64 has openings 77 and a central opening 78 for a cable, as will be explained later in more detail.

Figure 8:
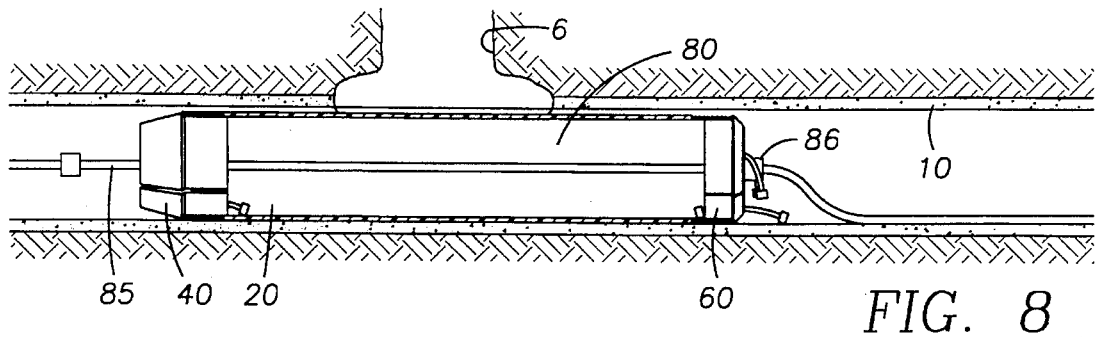
FIG. 8 illustrates the collapsible point-repair heads in the threaded sections of polyethylene pipe, which collectively is the preferred embodiment of the point-repair tool of the present invention, as the sections are pulled into position in the damaged section of sewer pipe.
Figure 9:
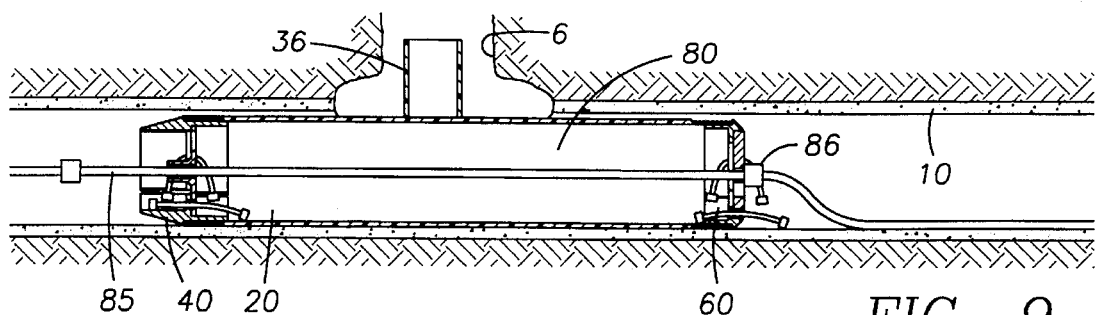
FIG. 9 illustrates the collapsible point-repair heads similarly as FIG. 8 except in cross-section.
Figure 10:
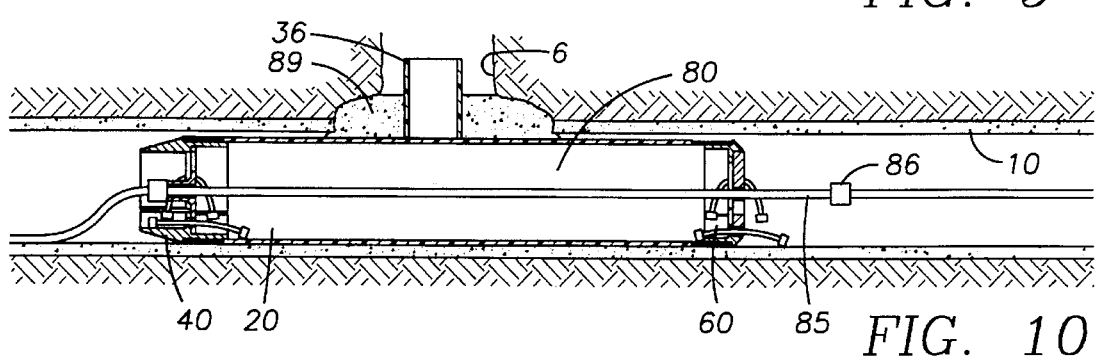
FIG. 10 illustrates the beginning of the pulling of the cable to remove the collapsible point-repair heads after the polyethylene section has been secured, specifically fused.
Figure 11:
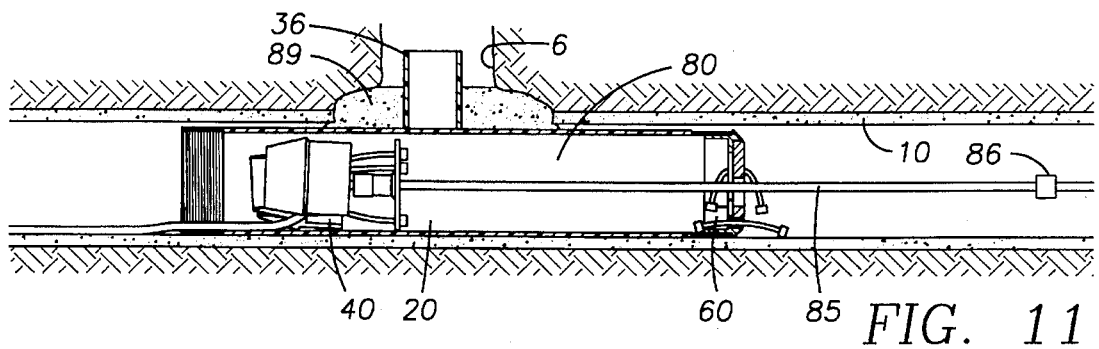
FIG. 11 illustrates the collapse of the point-repair nose head as the cable is pulled.
Figure 12:
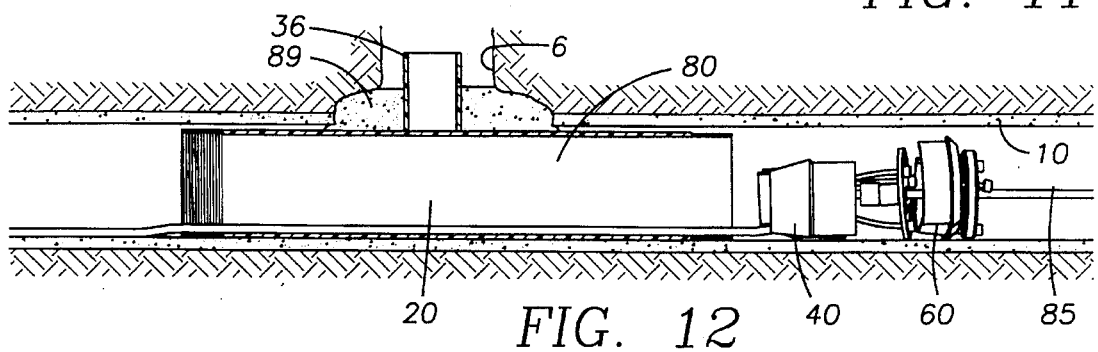
FIG. 12 illustrates the collapse of the base point-repair head as both heads are pulled to a manhole upon completion of the point-repair.

Referring now to FIGS. 8 to 12 which illustrate the method of making a point-repair with insertion tool 80. As illustrated in FIG. 8, the insertion tool 80 is pulled into position within the damaged sewer line 10 from a man hole 14 (not shown) from right to left by a cable 85. The cable has a cable grip 86 which seats against the plate 64 of head 60. The cable may be pulled in by hand or a winch may be used. The tool 80 is observed from the opening 6 as first the head 40 passes ant then the painted strips 16 are observed until the section 20 is properly placed. As illustrated in FIG. 9, the down hole fusing operation is carried out and a polyethylene t-section 36 is fused to the polyethylene section 20. The fusing machine or apparatus 22 is removed. As illustrated in FIG. 10, grout is introduced around the t-section 36 after the fused pipes have completely cooled. A preferred grout is cement 89. The collapsible heads 40 and 60 are removed from the section 20 by pulling on the cable 85 from the right end. The cable has a cable grip 87 which seats against plate 44 of head 40 and pulls the plate out from the sections 42 as illustrated in FIG. 11. AS the cable 85 is pulled further the head 40 contacts the head 60 and the plate 64 is pulled loose of the sections 62 as illustrated in FIG. 12.

It is clear that alternatives may be made in the design to collapse the heads 40 and 60 by pulling in different directions. However, it is preferred that the pulling out be in the same length of damaged sewer line 10 as the point-repair insertion tool has been pulled into since there will be no unexpected surprises in that length of line.

I claim:

1. A method for making a point repair in a damaged utility line which comprises:

forming an opening from the surface and into said damaged utility line;

pulling a point-repair insertion tool having two collapsible heads, one disposed at each end of a section of polyolefin pipe, inside said damaged utility line and spanning said opening;

securing from the surface said section of polyolefin pipe inside said damaged utility line; and filling said opening.

2. A method according to claim 1 wherein said collapsible heads are collapsed and removed from said section of polyolefin pipe and said utility line after said section has been secured.

3. A method according to claim 2 wherein said collapsible heads are collapsed by pulling on a cable and removed from said section of polyolefin pipe and said utility line by said cable.

4. A collapsible point-repair insertion head which comprises:

a circular plate;

a plurality of hollow cylindrical sections, each section having an inner radius which is the same as the radius of said circular plate and having a radially extending support member, the cumulative circumference of said sections being less than 345°; and means loosely connecting each cylindrical section to said plate.

5. A collapsible point-repair insertion head according to claim 4 wherein said circular plate has a plurality of openings.

6. A collapsible point-repair insertion head according to claim 4 wherein there are at least three cylindrical sections.

7. A collapsible point-repair insertion head according to claim 4 wherein the cumulative circumference of said sections is between 270° and 315°.

8. A collapsible point-repair insertion head according to claim 4 wherein the means loosely connecting each cylindrical section to said plate is a flexible cable.

9. A collapsible point-repair insertion head according to claim 8 wherein said flexible cable is attachable to said radially extending support member of each cylindrical section.

10. A collapsible point-repair insertion head according to claim 4 wherein extending from said cylindrical section is a conical section.

11. A point-repair insertion tool which comprises:

a section of polyolefin pipe, said pipe having a nose end and a base end;

a collapsible point-repair head at the nose end of said pipe, said head including a circular plate;

a plurality of hollow cylindrical sections, each section having an inner radius which is the same as the radius of said circular plate and having a radially extending support member, the cumulative circumference of said sections being less than 345°; and means loosely connecting each cylindrical section to said plate;

a collapsible point-repair head at the base end of said pipe, said head including a circular plate;

a plurality of hollow cylindrical sections, each section having an inner radius which is the same as the radius of said circular plate and having a radially extending support member, the cumulative circumference of said sections being less than 345°; and means loosely connecting each cylindrical section to said plate; and a cable which extends through each plate of said collapsible heads for collapsing said heads.

12. A point-repair insertion tool according to claim 11 wherein said polyolefin pipe is comprised of polyethylene.

13. A point-repair insertion tool according to claim 11 wherein said collapsible head at the nose end of said pipe has a conical section extending from said cylindrical sections.

14. A point-repair insertion tool according to claim 11 wherein said the cumulative circumference of said sections is between 330° and 270°.

* * * * *